(12) United States Patent
Dezfouli et al.

(10) Patent No.: US 12,348,370 B2
(45) Date of Patent: Jul. 1, 2025

(54) SYSTEMS, METHODS, AND DEVICES FOR SECURE MANAGEMENT OF WIRELESS DEVICE ASSOCIATIONS

(71) Applicant: Cypress Semiconductor Corporation, San Jose, CA (US)

(72) Inventors: Behnam Dezfouli, San Jose, CA (US); Vikram Kumar Ramanna, San Jose, CA (US); Rakesh Taori, McKinney, TX (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 18/459,199

(22) Filed: Aug. 31, 2023

(65) Prior Publication Data
US 2025/0080421 A1    Mar. 6, 2025

(51) Int. Cl.
H04L 41/08    (2022.01)
H04L 41/082    (2022.01)
H04L 41/0895    (2022.01)

(52) U.S. Cl.
CPC ........ *H04L 41/0889* (2013.01); *H04L 41/082* (2013.01); *H04L 41/0895* (2022.05)

(58) Field of Classification Search
None
See application file for complete search history.

(56) References Cited

U.S. PATENT DOCUMENTS

| | | | | |
|---|---|---|---|---|
| 7,340,500 | B2* | 3/2008 | Traversat | H04L 63/029 709/227 |
| 8,204,992 | B2* | 6/2012 | Arora | H04L 67/107 713/168 |
| 8,825,830 | B2* | 9/2014 | Newton | H04L 65/403 709/223 |
| 9,755,914 | B2* | 9/2017 | Newton | H04L 69/03 |
| 10,659,116 | B1* | 5/2020 | Silverman | H04L 27/0008 |
| 10,848,377 | B2* | 11/2020 | Prasad | H04W 40/34 |
| 10,917,314 | B1* | 2/2021 | Iyer | H04L 41/042 |
| 10,924,990 | B2* | 2/2021 | Tchigevsky | H04W 48/20 |
| 10,992,600 | B2* | 4/2021 | Wang | H04L 49/70 |
| 11,064,375 | B2* | 7/2021 | Ran | H04L 43/10 |
| 2002/0184310 | A1* | 12/2002 | Traversat | H04L 9/40 709/204 |
| 2008/0115125 | A1* | 5/2008 | Stafford | H04L 69/04 718/1 |
| 2008/0159217 | A1* | 7/2008 | Chang | H04W 72/20 370/329 |

(Continued)

*Primary Examiner* — Ranodhi Serrao

(57) ABSTRACT

Systems, methods, and devices manage associations between wireless devices. Methods include identifying a plurality of wireless devices communicatively coupled to an access point and generating, using one or more processing elements, a plurality of groups of wireless devices based, at least in part, on a plurality of device classification parameters associated with the plurality of wireless devices. Methods further include generating, using the one or more processing elements, a plurality of containers for the plurality of groups of wireless devices based on network configuration information, and implementing, using the one or more processing elements, the plurality of containers in the access point, wherein each of the plurality of groups of wireless devices has at least one associated container.

16 Claims, 10 Drawing Sheets

(56) References Cited

U.S. PATENT DOCUMENTS

| | | | |
|---|---|---|---|
| 2014/0200036 A1* | 7/2014 | Egner | H04W 8/245 |
| | | | 455/456.3 |
| 2014/0379928 A1* | 12/2014 | Song | G06F 9/45558 |
| | | | 709/226 |
| 2016/0359769 A1* | 12/2016 | Wang | H04L 49/70 |
| 2020/0228466 A1* | 7/2020 | Wang | H04L 69/22 |
| 2020/0244517 A1* | 7/2020 | Prasad | H04L 41/0668 |
| 2020/0245164 A1* | 7/2020 | Ran | H04L 43/10 |
| 2020/0374957 A1* | 11/2020 | Huang | H04L 12/4641 |
| 2021/0203575 A1* | 7/2021 | Hanetz | G06F 16/35 |
| 2021/0274357 A1* | 9/2021 | Furuichi | H04W 16/14 |
| 2021/0314794 A1* | 10/2021 | Ran | H04W 24/06 |
| 2022/0039163 A1* | 2/2022 | Park | H04B 7/0695 |
| 2022/0116235 A1* | 4/2022 | Ernohazy | H04M 7/006 |
| 2023/0379724 A1* | 11/2023 | Soryal | H04W 16/18 |

* cited by examiner

SYSTEMS, METHODS, AND DEVICES FOR SECURE MANAGEMENT OF WIRELESS DEVICE ASSOCIATIONS

TECHNICAL FIELD

This disclosure relates to wireless devices, and more specifically, to enhancement of management of associations between such wireless devices.

BACKGROUND

Wireless devices may communicate with each other via wireless communications networks in accordance with one or more wireless communications protocols. Moreover, a device, such as an access point, may be used to manage communication between several wireless devices, which may be stations, and a larger communications network. Stations managed by such an access point may have various network configuration information used by the access point to manage access of the stations to the network. As the number of wireless devices connected to the access point increases, the number of settings and entries in the network configuration becomes large. Conventional techniques for managing such information and stations remain limited because they are not able to manage such information as well implement network configuration changes in an efficient and scalable manner.

DETAILED DESCRIPTION

Figure 1:
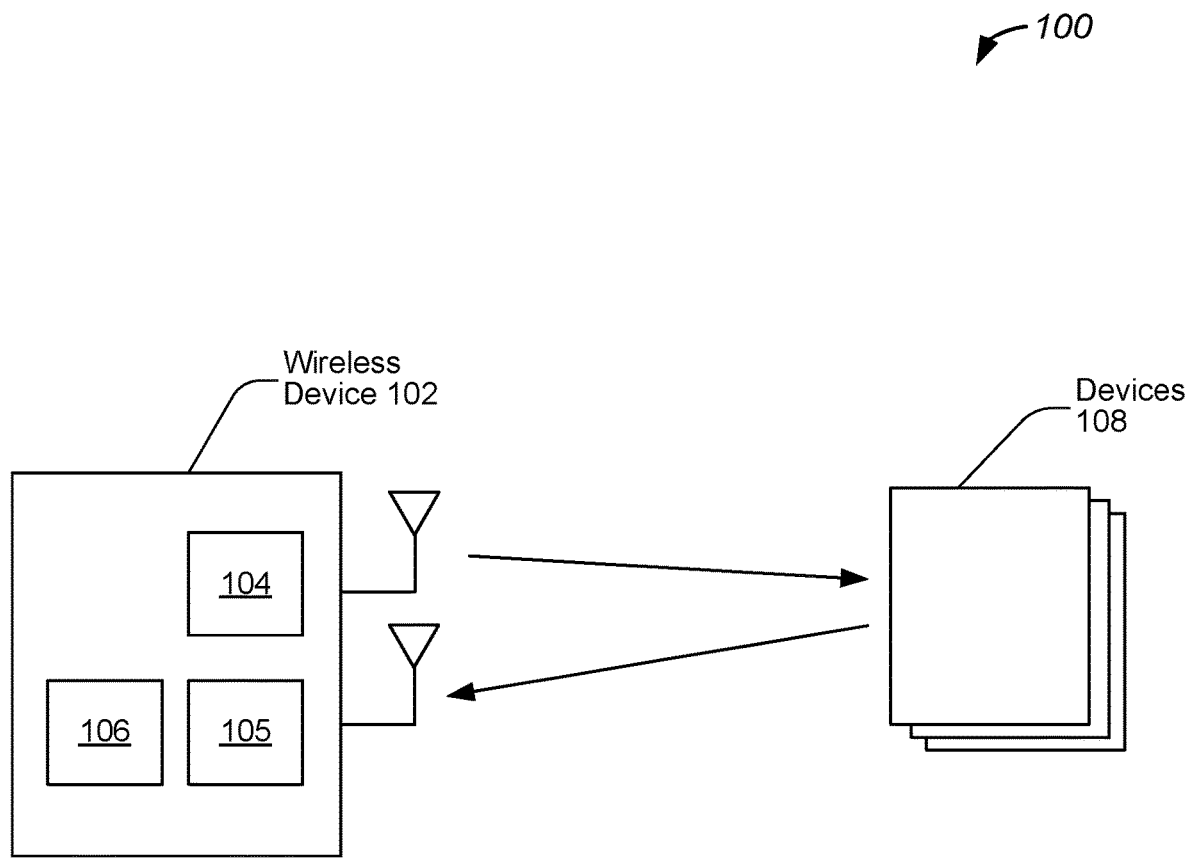
FIG. 1 illustrates an example of a system for secure management of wireless device associations, configured in accordance with some embodiments.

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Wireless networks may support communication between multiple different types of devices having different communications capabilities. For example, a wireless network may be a Wi-Fi network, and an access point (AP) may be connected to that network to manage communications between several wireless devices, such as stations, and a larger network, such as one connected to the internet. Such wireless devices may range in capabilities, and may be user devices such as laptops, smartphones, and other smart devices, such as wearable devices and smarthome devices. The wireless devices may also be IoT devices, such as security cameras, thermostats, air quality sensors, and other environmental sensors. The access point may use network connection information as well as authentication information for each of the devices connected to the network. Moreover, the access point may associate each wireless device with a particular wireless interface and an associated identifier, as will be discussed in greater detail below. Accordingly, when changes are made to network configurations, an access point may have to redo onboarding processes for wireless devices. Thus conventional techniques for managing such wireless devices remain limited because they incur an increased network overhead associated with additional discovery operations and onboarding operations whenever a network change is implemented.

Embodiments disclosed herein provide a virtualized and containerized environment for management of wireless device associations within an access point. In various embodiments, a virtualized environment may be implemented using containers or other implementations that enforce security and isolation rules for their associated processes. As used herein, virtual machines and containers may be implementations of virtualized environments. Accordingly, while specific reference may be made to a virtual machine or a container, it will be appreciated that any suitable virtualized environment may be used. As will be discussed in greater detail below, configuration of such containers may be managed by an entity, such as a user or manufacturer, via a communications interface, such as a cloud manager or other entity. The implementation of containers may be specific to sets of wireless devices classified based on features of the wireless devices themselves. Accordingly, different instances of containers may be instantiated for different sets of wireless devices, and such containers may be managed, changed, and updated independently. In this way, network configuration information for different groups of wireless devices may be managed via container configuration and deployment, and thus may be implemented in a manner that is scalable and reduces network overhead that might otherwise be incurred due to additional device/network discovery and onboarding operations.

FIG. 1 illustrates an example of a system for secure management of wireless device associations, configured in accordance with some embodiments. Accordingly, a system, such as system 100, may include wireless devices that are used for wireless communications, and are also configured to perform wireless connection management operations. Accordingly, as will be discussed in greater detail below, wireless devices included in system 100 may be configured to implement a virtualized connection management system to manage and update connections between multiple wireless devices.

In various embodiments, system 100 may include wireless device 102 which may be a wireless communications device that is configured as an AP. As discussed above, such wireless devices may be compatible with one or more wireless transmission protocols, such as a Wi-Fi protocol. In various embodiments, the Wi-Fi protocol may be one of various sub-standards, such as 802.11a, 802.11b, 802.11g. 802.11n, 802.11ac, 802.11e, 802.11ax, and 802.11be. It will be appreciated that while embodiments disclosed herein describe use of a Wi-Fi protocol, any suitable protocol may be used. For example, the wireless transmission protocol may be a Bluetooth protocol, such as a Bluetooth Low Energy protocol. It will be appreciated that while embodiments describe Wi-Fi, any suitable transmission protocol may be used. For example, the transmission protocol may be an ultrawideband protocol or a 15.4 protocol. Moreover, other transmission protocols, such as Bluetooth, Bluetooth Low Energy (BLE), Zigbee, and ultra-wide band (UWB) may also be used. Accordingly, while reference is made to access points and stations, it will be appreciated that devices specific to these protocols may be used as well. In some embodiments, wireless device 102 includes a transceiver configured in accordance with the wireless communication protocol. For example, wireless device 102 may include a Wi-Fi transceiver that is provided access to a communications medium. Accordingly, wireless device 102 may include a first transceiver, such as transceiver 104, and transceiver 104 may be compatible with a Wi-Fi specification and protocol.

As shown in FIG. 1, various wireless communications devices may be in communication with each other via one or more wireless communications mediums. Accordingly, wireless device 102 may include one or more antennas, and may also include processing device 106. In some embodiments, transceiver 104 may have an associated transmit and receive chain, as well as processing logic. As will be discussed in greater detail below, wireless device 102 may also include connection manager 105 which may be configured to support a containerized environment for wireless device connection management. While connection manager 105 is shown separately from processing device 106, it will be appreciated that connection manager 105 may be included within processing device 106. In various embodiments, such processing devices and transceivers may be configured to establish communications connections with other devices, and transmit data in the form of data packets via such communications connections. Such communications connections may be implemented using device-specific containers in a containerized environment. Thus, wireless devices disclosed herein, such as wireless device 102, are configured to implement a virtualized connection management system to manage and update connections between multiple wireless devices.

In some embodiments, system 100 may further include devices 108 which may also be wireless devices. As similarly discussed above, devices 108 may be compatible with one or more wireless transmission protocols, such as a Wi-Fi protocol. In some embodiments, devices 108 may be configured as stations in communication with wireless device 102. In one example, devices 108 may be internet of things (IoT) devices. In some embodiments, devices 108 may be smart devices or other devices, such as those found in gaming systems, security systems, thermostats and climate control systems, cars, other vehicles, wearable devices, and medical implants. Devices 108 may be different types of devices than wireless device 102. As discussed above, each of devices 108 may include one or more antennas, as well as processing devices and transceivers, which may also be configured to establish communications connections with other devices, and transmit data in the form of data packets via such communications connections.

Figure 2:
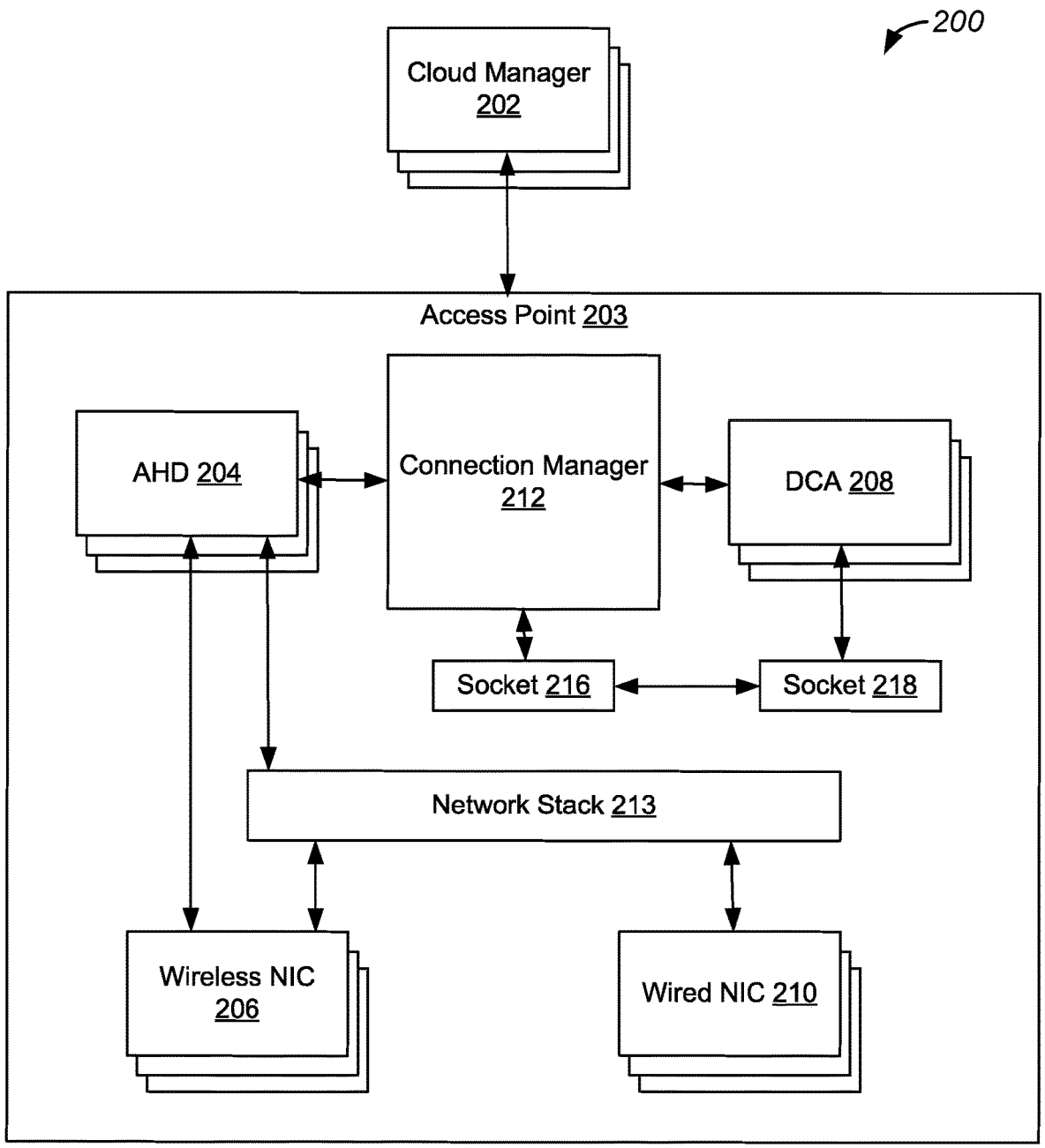
FIG. 2 illustrates an example of a system for secure management of wireless device associations, configured in accordance with some embodiments.

FIG. 2 illustrates an example of a system for secure management of wireless device associations, configured in accordance with some embodiments. As similarly discussed above, a system, such as system 200, may include wireless devices that are used for wireless communications, and are also configured to perform wireless connection management operations. More specifically, a device may be configured as an AP, and may be configured to manage connections with multiple different types of wireless devices. Accordingly, an AP included in system 200 is configured to implement a virtualized connection management system to facilitate management of connections with such wireless devices.

In various embodiments, system 200 includes cloud manager 202 which is configured to be communicatively coupled to an AP, such as AP 203, via a network, which may be a local network or may be the internet. In some embodiments, cloud manager 202 may be coupled to the AP via a wired or wireless connection. Accordingly, cloud manager 202 may also be coupled to one or more computing devices operated by an entity, such as a user, and may receive one or more inputs from the user. In this way, cloud manager 202 may receive inputs from a user or other network device, and may provide such input to AP 203. Similarly, cloud manager 202 may receive input from AP 203 and may relay information to the user or other network device. It will be appreciated that while cloud manager 202 is shown in FIG. 2, any suitable input device or system may be used. For example, cloud manager 202 may instead be a client machine operated by a user and configured to provide inputs to one or more components of AP 203, such as connection manager 212.

As discussed above, system 200 includes AP 203 which is configured to provide and manage network access for various wireless devices. Accordingly, in addition to being communicatively coupled to cloud manager 202, AP 203 is also communicatively coupled to various wireless devices which may be IoT devices. In various embodiments, AP 203 includes various components to facilitate management of connections with such wireless devices. For example, AP 203 includes AP hosting daemon (AHD) 204 which is configured to manage AP-specific functionalities such as beacon generation, configuration of wireless network interface cards (NICs), as well as device authentication and association operations. Accordingly, AHD 204 may be a background process configured to perform provisioning and device association operations included in an onboarding process. As shown in FIG. 2, AP 203 may include multiple AHDs associated with multiple different NICs.

In various embodiments, system 200 further includes wireless NICs, such as wireless NIC 206. Such NICs are configured in accordance with a wireless communications protocol. More specifically, wireless NIC 206 is a Wi-Fi NIC that is compatible with a Wi-Fi communications protocol. As shown in FIG. 2, system 200 may include several NICs which may be compatible with the same or different wireless communications protocols. In various embodiments, system 200 also includes wired NICs, such as wired NIC 210 which are configured in accordance with one or more communications protocols. As similarly discussed above, any suitable communications protocol may be supported by NICs disclosed herein.

System 200 additionally includes connection manager 212 configured to manage association of wireless devices. As similarly discussed above, connection manager 212 is configured to provide efficient and scalable management of devices association settings for one or more devices, as well as sets of devices. More specifically, connection manager 212 is configured to manage associations between interfaces of AP 203 and particular devices or sets of devices. In one example, a basic service set identifier (BSSID) is used to identify a particular interface of AP 203, such as a wireless NIC that has a particular media access control (MAC) address. In this example, connection manager 212 is configured to determine a BSSID associated with each device connected to AP 203, and also further configured to communicate this information with other components within AP 203, such as a device-specific container on AP (DCA), using a communications protocol. Thus, connection manager 212 is configured to assign devices to wireless interfaces, and thus manage associations between devices and BSSIDs. In one example, connection manager 212 configured to store such information in one or more data structures, such as a data table or a list. In some embodiments, connection manager 212 is also configured to communicate with AHD 204 and network stack 213 to retrieve statistical data and apply wireless interface configurations. Connection manager 212 may also be configured to perform packet switching between wireless NIC 206 and wired NIC 210.

As discussed above, system 200 also includes DCA 208 which is configured as a virtual machine or device-specific container for designated set of devices. Such virtual machines and/or containers may be implemented using Docker, Podman, or any suitable containerization tool. Accordingly, DCA 208 is an instance of a container that may be a device-specific virtual machine that is configured and managed by a device set manager, which may be an entity such as a user or a manufacturer. Thus, according to various embodiments, DCA 208 is configured to communicate wireless network connectivity configurations to its associated devices, and thus apply wireless connectivity settings to the set of devices for which it has been instantiated. In one example, DCA 208 may be associated with a set of devices, such as security cameras, that may be managed by the security camera manufacturer. Accordingly, DCA 208 may be specific to that set of security cameras, and other DCA instances may be implemented for other sets of devices, and may be independently configured without having to reconfigure DCA 208. In this way, DCAs may be independently implemented and configured for different sets of devices.

In various embodiments, DCA 208 is also configured to communicate device set information to connection manager 212. For example, based on a device type of its respective device set, DCA 208 may communicate one or more requested connection parameters to connection manager 212, such as a minimum received signal strength indicator (RSSI) value higher than −50 dBm between the device and AP 203. Other connection parameters may be designated switching delays or other measures of latency as well as bandwidth requirements of devices in the device set. In various embodiments, because an entity, such as a user or manufacturer, may manage the set of devices and provide input to DCA 208, the entity may also specify and define these connection parameters for each device set. Additional details regarding DCAs are discussed in greater detail below with reference to FIG. 3.

In various embodiments, connection manager 212 and DCA 208 are configured to collect device information for devices included in device sets. For example, device parameters may be obtained, such as channel utilization levels, packet delivery delay times, packet switching times between wired NICs and wireless NICs, duty cycle, power consumption levels, and round-trip time (RTT) threshold values. In this way, connection manager 212 and DCA 208 are configured to collect and maintain device set information for all device sets managed by connection manager 212, and may use such information to dynamically manage device assignment. For example, if a connection is unreliable or an RTT value is too large, such information may be communicated from DCA 208 to connection manager 212, and a different interface card may be selected. While DCA 208 is shown separately from connection manager 212, in some embodiments, connection manager 212 may be configured to implement the functionality of DCA 208, and thus DCA 208 may be included in connection manager 212. In some embodiments, connection manager 212 may also communicate with AHD 204 and network stack 213 to collect additional information such as traffic patterns associated with devices, transmission rates, and signal strengths.

System further includes sockets, such as socket 216 and socket 218. In various embodiments, such sockets may be used for communications between system components, such as connection manager 212 and DCA 208. Such sockets may be Unix domain sockets (UDS), transmission control protocol (TCP) sockets, user datagram protocol (UDP) sockets, or any other suitable type of socket. In some embodiments, connection manager 212 and DCA 208 may have access to a shared memory, and may communicate via the shared memory. In various embodiments, DCA 208 may also use sockets, such as socket 218, to communicate with its associated devices. Accordingly, if DCA 208 is implemented for a particular device set, it may communicate with the devices within that device set via socket 218.

System 200 also includes network stack 213 which is configured to include components of a stack for one or more communications protocols. As will be discussed in greater detail below with reference to FIG. 5, network stack 213 includes components of a Wi-Fi stack, and thus includes various layers configured to perform communications operations in accordance with a Wi-Fi communications protocol.

Figure 3:
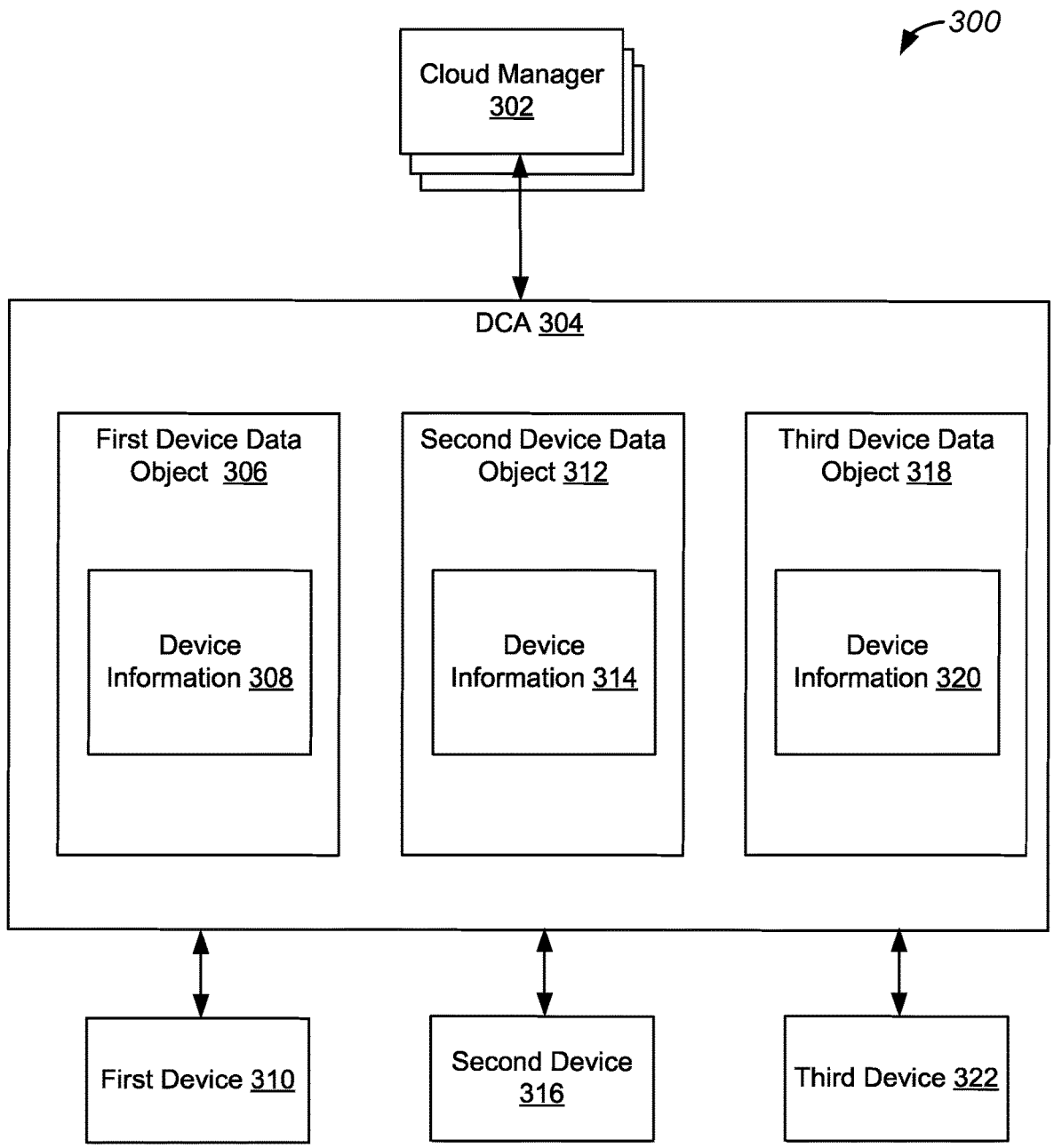
FIG. 3 illustrates another example of a system for secure management of wireless device associations, configured in accordance with some embodiments.

FIG. 3 illustrates another example of a system for secure management of wireless device associations, configured in accordance with some embodiments. A system, such as system 300, includes a cloud manager, such as cloud manager 302, that is communicatively coupled to one or more DCAs, such as DCA 304. As will be discussed in greater detail below, DCA 304 is configured to store and manage device information for various different devices included in a device set, and such device information may be stored and configured independently to support scalable device set deployment.

System 300 includes cloud manager 302 which is configured to be communicatively coupled to a device-specific container, such as DCA 304, via a network, which may be a local network or may be the internet. Accordingly, cloud manager 302 may be coupled to one or more computing devices operated by an entity, such as a user or manufacturer, and may receive one or more inputs from the user or manufacturer. In this way, cloud manager 302 may receive inputs from a user or other network device, and may provide such input to DCA 304 to facilitate management of device set settings stored by DCA 304.

In various embodiments, DCA 304 is a device-specific container that includes various device-specific data objects for each device included in a set of devices associated with DCA 304. For example, DCA 304 includes first device data object 306, second device data object 312, and third device data object 318 associated with first device 310, second device 316, and third device 322, respectively. In various embodiments, the device-specific data objects are configured to store device information, such as device information 308, device information 314, and device information 320. As discussed above, such device information includes device settings for devices included in the set of devices associated with DCA 304. Such device information may include communications port information as well as credential data. Device information may also include a MAC address, an internet protocol (IP) address, a service set identifier (SSID), a password, and a current BSSID that a device is connected to. Accordingly, an association between a BSSID and a device may be stored in the device information managed by a device-specific container, such as DCA 304. Device information may also include keys and certificates used to communicate with the devices. As will be discussed in greater detail below, such device information may be generated based on an input provided by cloud manager 302, which may be received during device association, or may be received from another component, such as a controller as will be discussed in greater detail below.

Accordingly, first device data object 306 includes device information 308, which includes settings for a first device included in a set of devices associated with DCA 304, such as first device 310. Similarly, device information 314 includes settings for a second device included in the set of devices, such as second device 316, and device information 320 includes settings for a third device included in the set of devices, such as third device 322. In some embodiments, device information is also stored in the connection manager. Accordingly, device information may have a redundant copy stored in another location that provides fault tolerance. More specifically, if DCA 304 crashes and has to be restarted, it may synchronize such data with the redundant copy stored in the connection manager.

In some embodiments, different device sets may be generated for different entities or users. For example, a particular manufacturer may have its own device set for multiple IoT devices made by that manufacturer, and may have its own device-specific container for that set of IoT devices. Moreover, multiple device-specific containers may be generated for a single entity to support multiple device set configurations. Furthermore, different device-specific containers and device sets may be defined for different security levels that may have different permission levels. Accordingly, multiple device sets may be generated to support security and privacy features. As discussed above, such device sets may be generated and configured independently, and in a scalable manner.

Figure 4:
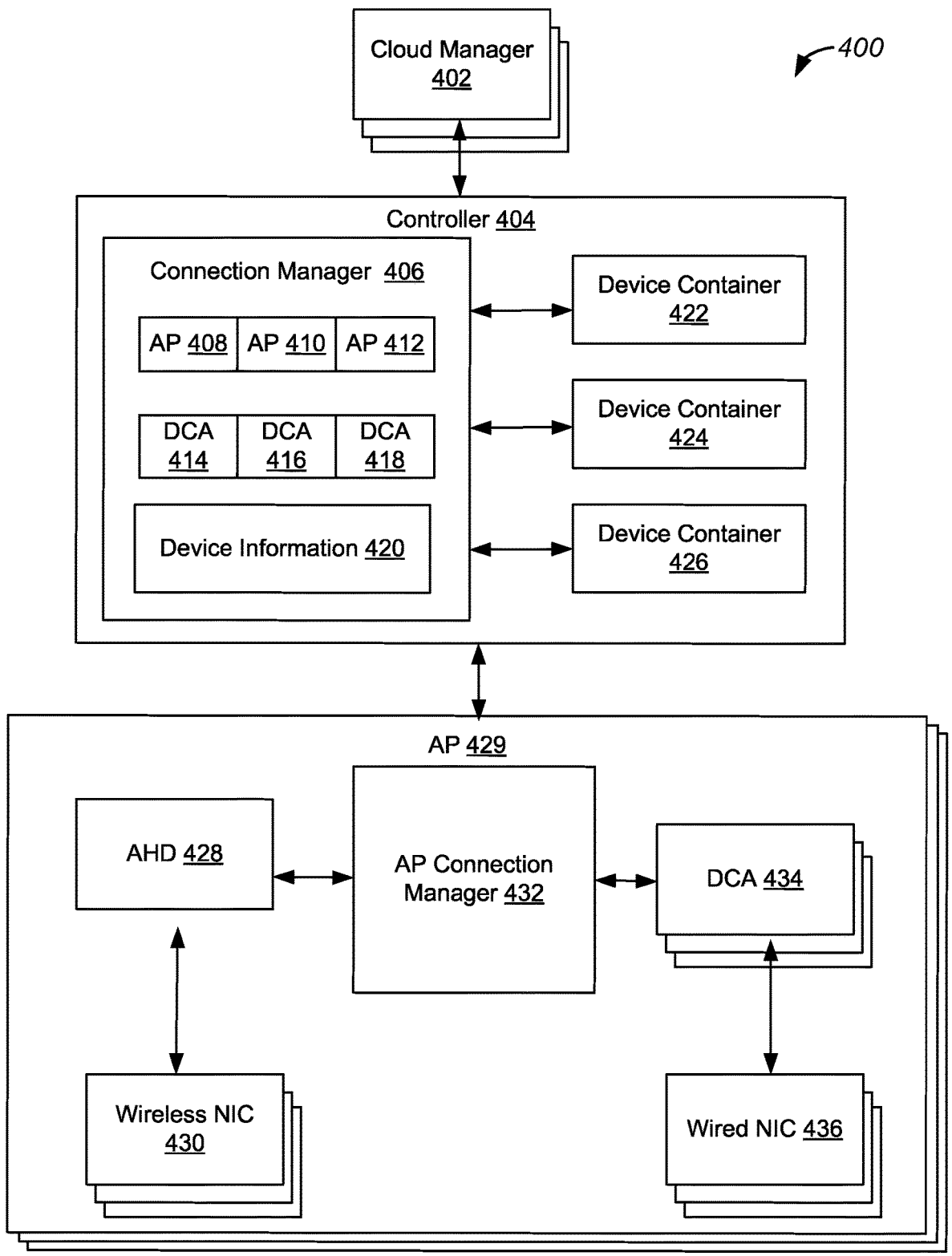
FIG. 4 illustrates an additional example of a system for secure management of wireless device associations, configured in accordance with some embodiments.

FIG. 4 illustrates an additional example of a system for secure management of wireless device associations, configured in accordance with some embodiments. As similarly discussed above, a system, such as system 400, may include wireless devices that are used for wireless communications, and are also configured to perform wireless connection management operations. In various embodiments, system 400 may also include multiple APs. Accordingly, a controller, such as controller 404, may be configured to include a connection manager, such as connection manager 406, and the controller may be communicatively coupled to multiple APs to facilitate management of sets of devices for those APs. In this way, a controller may be used to centrally manage multiple APs associated with multiple sets of devices.

System 400 includes cloud manager 402 which is configured to be communicatively coupled to a controller, such as controller 404, via a network, which may be a local network or may be the internet. As similarly discussed above, cloud manager 402 may also be coupled to one or more computing devices operated by an entity, such as a user or a manufacturer, and may receive one or more inputs from the user and/or manufacturer. In this way, cloud manager 402 may receive inputs from a user or other network device, and may provide such input to controller 404. It will be appreciated that while cloud manager 402 is shown in FIG. 4, any suitable input device or system may be used. For example, cloud manager 402 may instead be a client machine operated by a user and configured to provide inputs to one or more components of controller 404.

As discussed above, system 400 additionally includes controller 404 which is configured to provide centralized management of associations of wireless devices with multiple APs managed by controller 404. More specifically, controller 404 is configured to centrally store and manage AP information and associated device set information, and communicate with AP connection managers to implement and manage device set configurations for those APs.

In some embodiments, controller 404 includes connection manager 406 which is configured to include data structures that are configured to store such AP information and associated device set information. For example, connection manager 406 may store data objects such as AP 408, AP 410, and AP 412. Such data objects may include information such as one or more identifiers for the APs, as well as other connection parameters for the APs. Connection manager 406 may also store data objects configured to store device-specific container information for such APs. Accordingly, connection manager 406 may store data objects such as DCA 414, DCA, 416, and DCA 418. Such data objects may include information such as one or more identifiers for the device-specific containers, as well as other connection parameters and network configuration parameters for the device-specific containers, as similarly discussed above with regards to device information.

Controller 404 further includes various device-specific containers, such as device container 422, device container 424, and device container 426. In some embodiments, such device-specific containers implemented in controller 404 are configured to communicate with respective cloud managers, such as cloud manager 402, and are also configured to communicate with device specific containers implemented in APs, such as DCA 434. Accordingly, device containers implemented on controller 404 are configured to receive input from cloud manager 402, and facilitate management of containers implemented on APs, such as DCA 434 based on such received input. In some embodiments, when configured in this way, local changes and policies may be enforced via DCA 434 and global changes and policies may be enforced via a device container on controller 404. The device containers of controller 404 may also provide redundance for DCA 434 if AP 429 needs to be restarted and data stored in DCA 434 is lost. It will be appreciated that while FIG. 4 illustrates device-specific containers in both controller 404 and AP 429, embodiments disclosed herein also provide the ability to implement system 400 with no device-specific containers in controller 404, or no device-specific containers in AP 429.

System 400 further includes AP 429. As similarly discussed above with reference to FIG. 2 and FIG. 3, AP 429 includes network interfaces, such as wireless NIC 430 and wired NIC 436. AP 429 additionally includes AHD 428 which is configured to manage AP-specific functionalities such as beacon generation, configuration of wireless NICs, as well as device authentication and association operations. AP 429 further includes DCA 434 which is configured as a virtual machine or device-specific container for designated set of devices. AP 429 also includes AP connection manager 432 which is configured to manage association of wireless devices within AP 429. Accordingly, AP connection manager 432 is configured to enforce connection parameters for device sets within AP 429 based on inputs received from controller 404.

Figure 5:
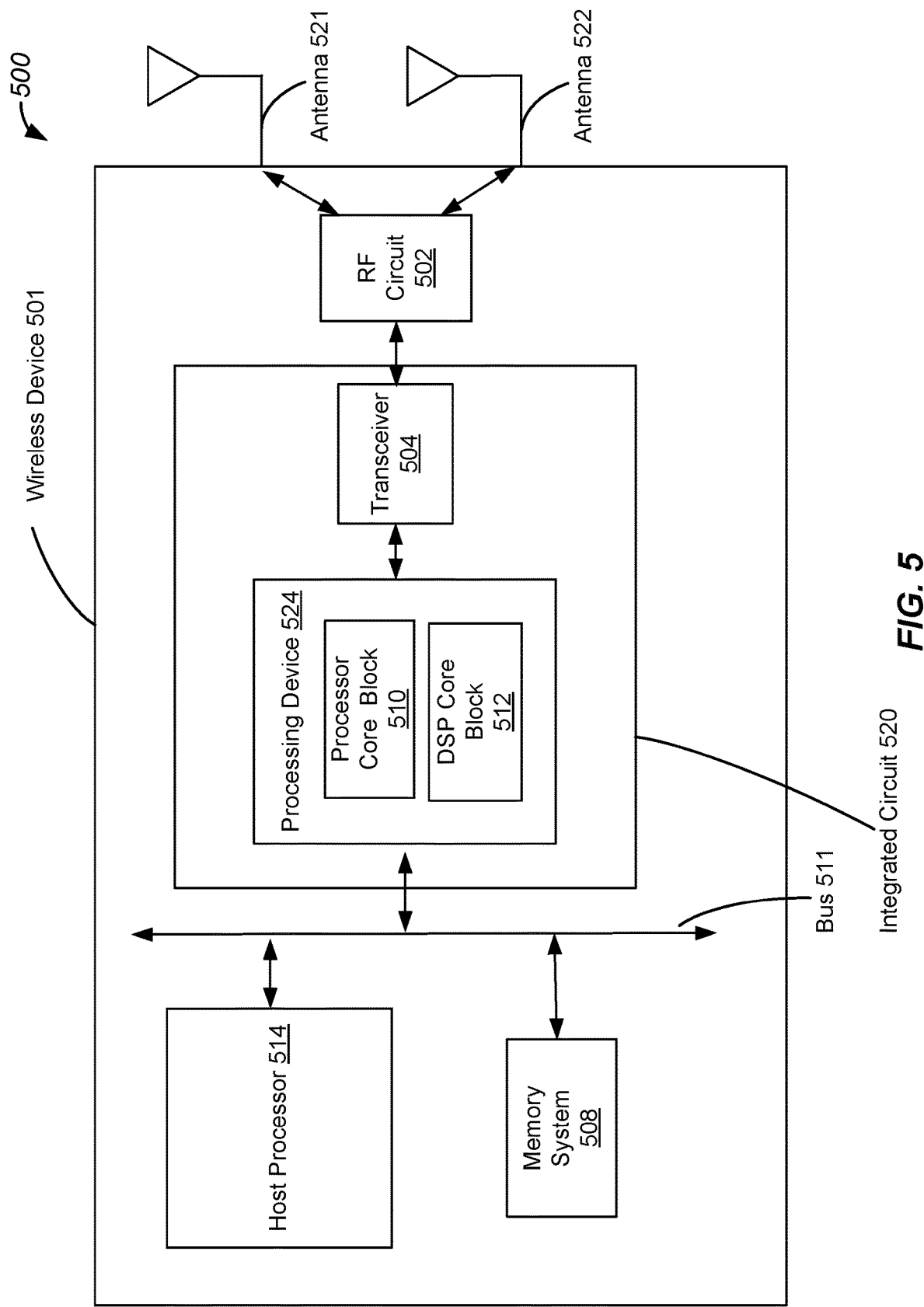
FIG. 5 illustrates an example of a device for secure management of wireless device associations, configured in accordance with some embodiments.

FIG. 5 illustrates an example of a device for secure management of wireless device associations, configured in accordance with some embodiments. More specifically, FIG. 5 illustrates an example of a system, such as system 500, that includes wireless device 501. It will be appreciated that wireless device 501 may be one of any of the wireless devices discussed above with reference to FIG. 1, such as wireless device 102 and devices 108.

In various embodiments, wireless device 501 includes one or more transceivers, such as transceiver 504. In one example, transceiver 504 is configured to transmit and receive signals using a communications medium that may include antenna 521 or antenna 522. As noted above, transceiver 504 may be a Wi-Fi transceiver. Accordingly, transceiver 504 may be compatible with a Wi-Fi communications protocol, such as an 802.11ax protocol, an 802.11ac protocol, an 802.11be protocol, or any of the protocols discussed above with reference to Wi-Fi sub-standards. In various embodiments, transceiver 504 includes a modulator and demodulator as well as one or more buffers and filters, that are configured to generate and receive signals via antenna 521 and/or antenna 522. While various embodiments are described with reference to Wi-Fi communications protocols, it will be appreciated that any suitable protocol may be used, and protocol specific terminology may differ.

In various embodiments, system 500 further includes processing device 524 which may include logic implemented using processing elements and/or one or more processor cores. Accordingly, processing device 524 is configured to perform device connection and device set management operations, as will be discussed in greater detail below. Moreover, processing device 524 includes one or more components configured to implement a medium access control (MAC) layer that is configured to control hardware associated with a wireless transmission medium, such as that associated with a Wi-Fi transmission medium. In one example, processing device 524 may include processor core block 510 that may be configured to implement a driver, such as a Wi-Fi driver. Processing device 524 may further include digital signal processor (DSP) core block 512 which may be configured to include microcode. In various embodiments, processor core block 510 comprises multiple processor cores which are each configured to implement specific portions of a wireless protocol interface. Accordingly, components of a network stack underlying a wireless communications protocol may be implemented via processor core block 510 and one or more other components of processing device 524.

System 500 further includes radio frequency (RF) circuit 502 which is coupled to antenna 521 and antenna 522. In various embodiments, RF circuit 502 may include various components such as an RF switch, a diplexer, and a filter. While FIG. 5 illustrates system 500 as having two antennas, it will be appreciated that system 500 may have a single antenna, or any suitable number of antennas. Accordingly, RF circuit 502 may be configured to select an antenna for transmission/reception, and may be configured to provide coupling between the selected antenna, such as antenna 521, and other components of system 500 via a bus, such as bus 511. While one RF circuit is shown, it will be appreciated that wireless device 501 may include multiple RF circuits. Accordingly, each of multiple antennas may have its own RF circuit.

System 500 includes memory system 508 which is configured to store one or more data values associated with device connection and device set management operations discussed above and in greater detail below. Accordingly, memory system 508 includes storage device, which may be a non-volatile random access memory (NVRAM) configured to store such data values, and may also include a cache that is configured to provide a local cache. In various embodiments, system 500 further includes host processor 514 which is configured to implement processing operations implemented by system 500. In some embodiments, host processor 514 and memory system 508 are configured to implement a containerized environment, as disclosed herein. For example, host processor 514 and memory system 508 may be configured to execute a virtual environment used to implement the device containers and connection managers discussed above. It will be appreciated that processing device 524 may also be configured to implement the device containers and connection managers discussed above. In some embodiments, a combination of both host processor 514, memory system 508, and processing device 524 may be used.

It will be appreciated that one or more of the above-described components may be implemented on a single chip, or on different chips. For example, transceiver 504 and processing device 524 may be implemented on the same integrated circuit chip, such as integrated circuit chip 520. In another example, transceiver 504 and processing device 524 may each be implemented on their own chip, and thus may be disposed separately as a multi-chip module or on a common substrate such as a printed circuit board (PCB). It will also be appreciated that components of system 500 may be implemented in the context of a low energy device, a smart device, or a vehicle such as an automobile. Accordingly, some components, such as integrated chip 520, may be implemented in a first location, while other components, such as antenna 521, may be implemented in second location, and coupling between the two may be implemented via a coupler such as RF circuit 502.

Figure 6:
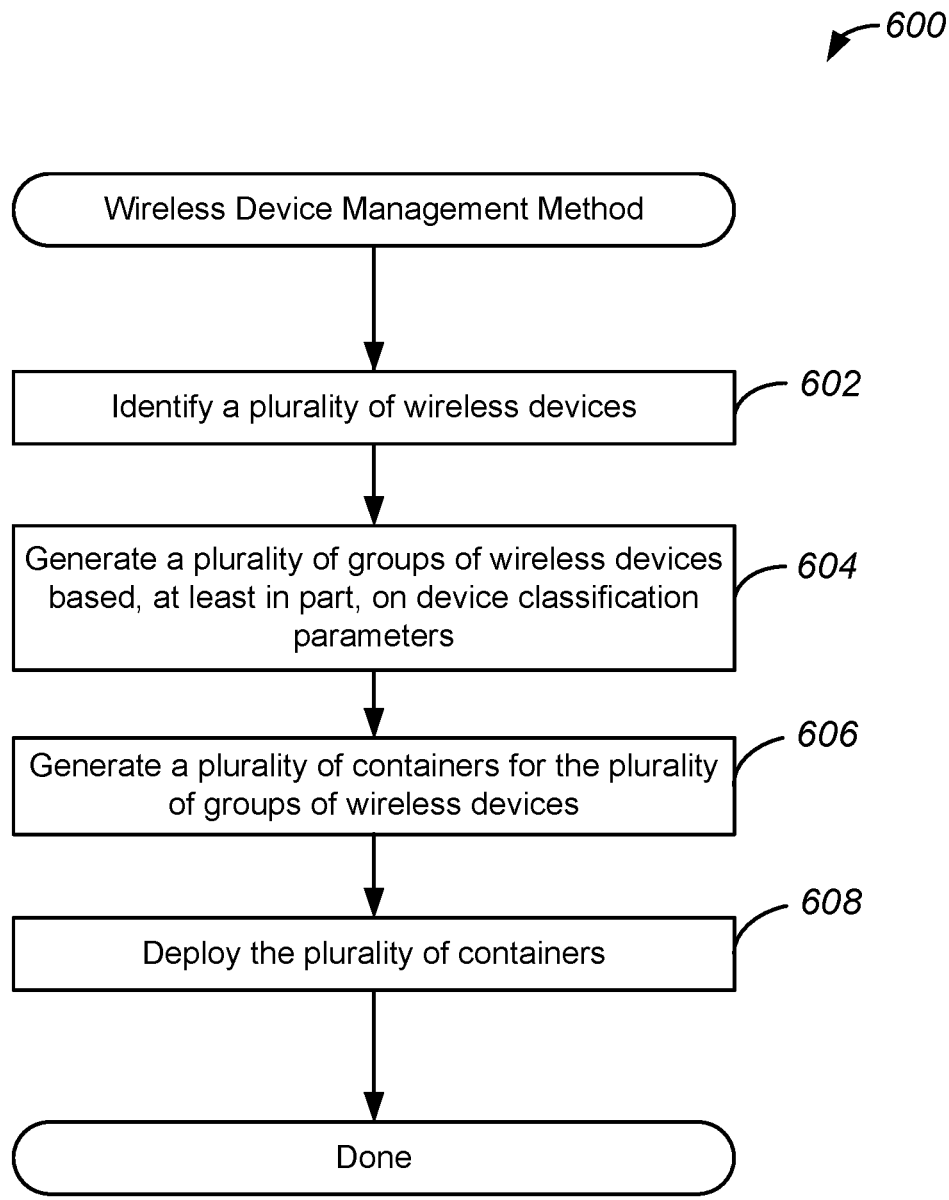
FIG. 6 illustrates an example of a method for secure management of wireless device associations, performed in accordance with some embodiments.

FIG. 6 illustrates an example of a method for secure management of wireless device associations, performed in accordance with some embodiments. Accordingly, a method, such as method 600, may be performed to implement a containerized environment capable of performing wireless connection management operations, as well as updating connections between multiple wireless devices. As will be discussed in greater detail below, such management of sets of devices may be implemented in a manner that is scalable, and that supports independent management of multiple sets of devices.

Method 600 may perform operation 602 during which a plurality of wireless devices are identified. In various embodiments, the AP may already know which devices are currently connected to the AP as, for example, a plurality of stations. As discussed above, such devices may be IoT devices or any suitable type of device. In some embodiments, if the devices are not known or need to be updated, one or more device discovery operations may be performed to identify all devices in communication with the AP.

Method 600 may perform operation 604 during which a plurality of groups of wireless devices is generated based, at least in part, on device classification parameters. In various embodiments, the device classification parameters may be used to classify the plurality of wireless devices into groups based on parameters and features of the wireless devices. For example, the device classification parameters may include one or more identifiers identifying a manufacturer of a device, one or more wireless capabilities of a device, as well as one or more constraints or requirements of a device. In some embodiments, such device classification parameters may be received from an entity via, for example, a cloud manager, or may retrieved by a connection manager from memory. In this way, device classification parameters may be retrieved and compared against device information to generate groups of wireless devices.

Method 600 may perform operation 606 during which a plurality of containers is generated for the plurality of groups of wireless devices. In various embodiments, the containers are generated by the connection manager based, at least in part, on the generated groups of wireless devices. More specifically, a container may be generated for each group such that each group of wireless devices represents a set of wireless devices having similar classification parameters, and each group has its own device container. In some embodiments, such containers may be generated by an entity, such as a manufacturer, and may be downloaded by the connection manager via, for example, a cloud manager.

Method 600 may perform operation 608 during which the plurality of containers is deployed. Accordingly, the containers may be instantiated and deployed by the connection manager within the AP, and device parameters specified by the device information may be enforced for the groups of devices. Accordingly, deployment of the containers may also include implementation of new device associations associated with such containers.

Figure 7:
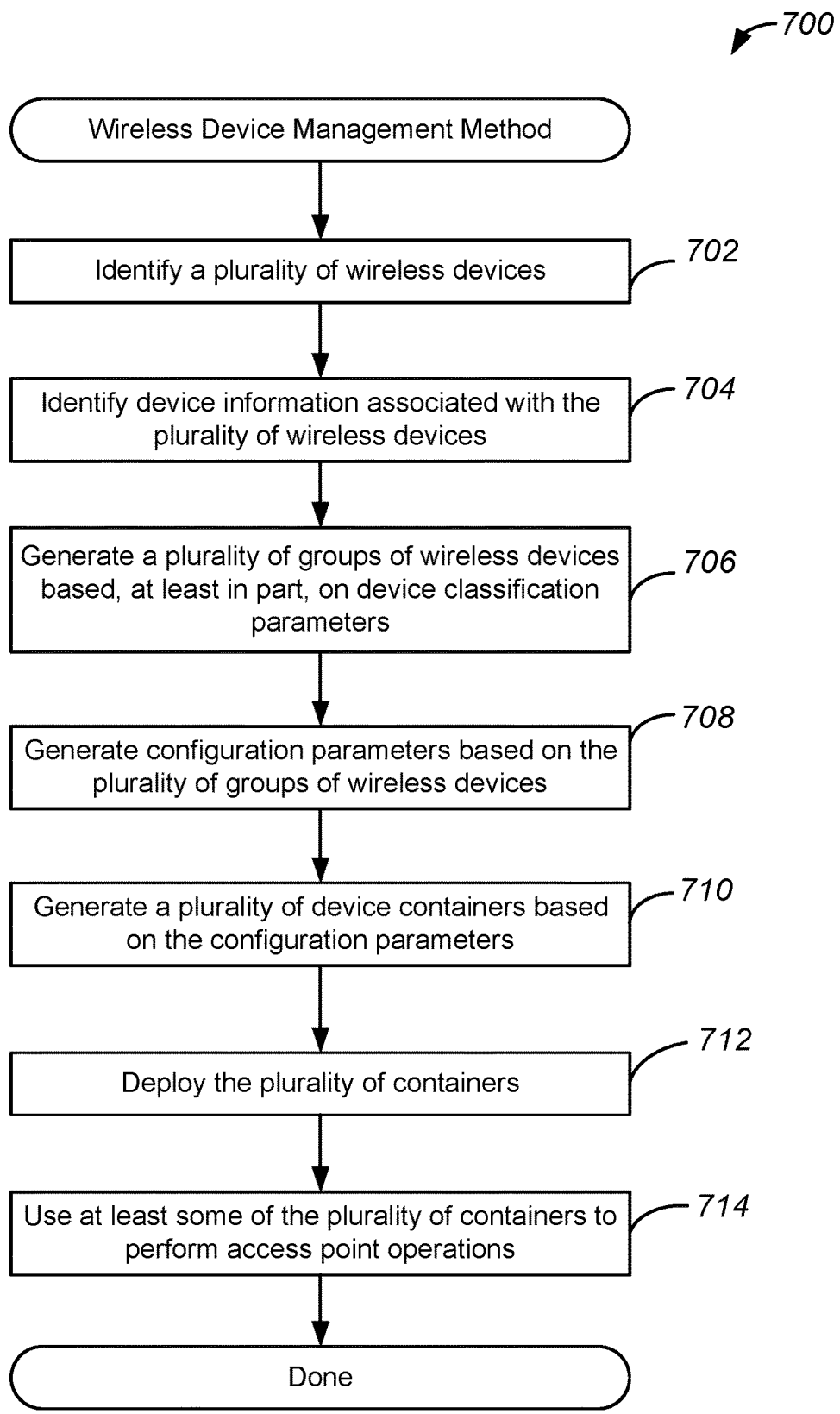
FIG. 7 illustrates another example of a method for secure management of wireless device associations, performed in accordance with some embodiments.

FIG. 7 illustrates another example of a method for secure management of wireless device associations, performed in accordance with some embodiments. As similarly discussed above, a method, such as method 700, may be performed to implement a containerized environment capable of performing wireless connection management operations, as well as updating connections between multiple wireless devices. As will be discussed in greater detail below, device provisioning and association may be configured to include the configuration and deployment of device-specific containers within an AP.

Method 700 may perform operation 702 during which a plurality of wireless devices are identified. In various embodiments, the AP may have a previously stored list of devices currently connected to the AP as, for example, a plurality of stations. Moreover, the AP may perform various network and device discovery operations to identify one or more wireless devices. Accordingly, polling operations may be performed to identify devices active on a particular wireless network.

Method 700 may perform operation 704 during which device information associated with the plurality of wireless devices may be identified. Accordingly, during operation 704, the AP may obtain various device information from the devices and/or infer such information based on responses received from the devices. For example, such device information may include one or more of device identifiers, manufacturer identifiers, MAC addresses, IP addresses, as well as security and authentication information. Device information may also include observed metrics such as RSSI levels and latency parameters.

Method 700 may perform operation 706 during which a plurality of groups of wireless devices is generated based, at least in part, on the device classification parameters. As discussed above, such device classification parameters may be determined by the AP, or may be received from an entity via, for example, a cloud manager. Such device classification parameters may identify one or more dimensions used to define a group of devices. For example, a manufacturer identifier may be used to identify all devices made by the manufacturer, and to include those devices in a group. In this way, device classification parameters may be retrieved and compared against the device information to generate groups of wireless devices.

Method 700 may perform operation 708 during which configuration parameters may be generated based on the plurality of groups of wireless devices. In various embodiments, the configuration parameters are used to configure an instantiation of a container based on features of devices included in a device group. In various embodiments, the containers may be configured via a software application associated with he container, as may be supported by a containerization platform, such as Docker.

Method 700 may perform operation 710 during which a plurality of containers is generated based on the configuration parameters. In some embodiments, the containers are generated by the connection manager based, at least in part, on the generated groups of wireless devices and their associated configuration parameters. More specifically, a container may be generated for each group based on configuration parameters specific to that group. In some embodiments, such containers may be generated by an entity, such as a manufacturer, and may be downloaded by the connection manager via, for example, a cloud manager.

Method 700 may perform operation 712 during which the plurality of containers is deployed. Accordingly, the containers may be instantiated and deployed by the connection manager within the AP, and device parameters specified by the device information may be enforced for the groups of devices. Accordingly, deployment of the containers may also include implementation of new device associations associated with such containers.

Method 700 may perform operation 714 during which at least some of the plurality of containers are used to perform access point operations. Accordingly, at least some of the plurality of containers are used for subsequent wireless communications operations with wireless devices. More specifically, settings and credential information for devices may be stored and managed within device-specific containers, and such settings may used to manage authentication of and communication with the devices.

Figure 8:
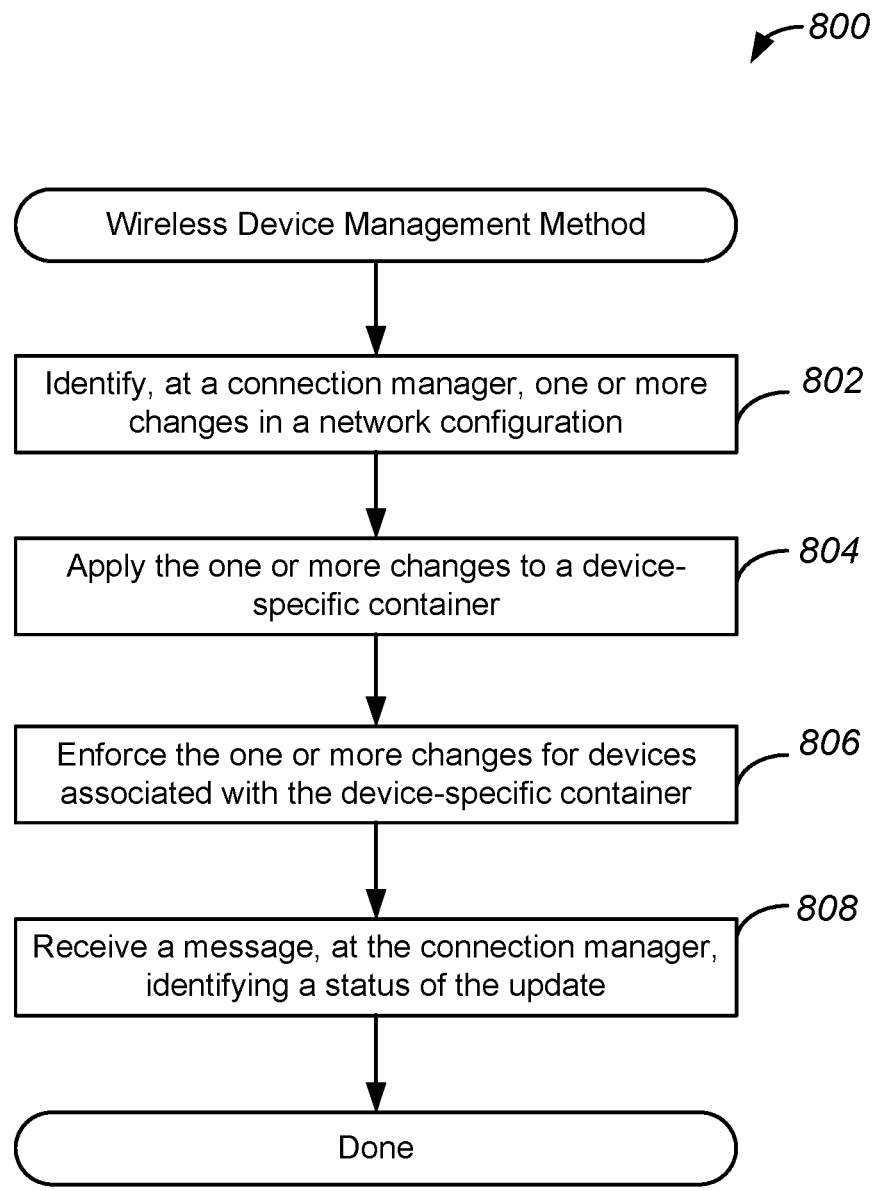
FIG. 8 illustrates an additional example of a method for secure management of wireless device associations, performed in accordance with some embodiments.

FIG. 8 illustrates an additional example of a method for secure management of wireless device associations, performed in accordance with some embodiments. As similarly discussed above, a method, such as method 800, may be performed to implement a containerized environment capable of performing wireless connection management operations. As will be discussed in greater detail below, device-specific containers may be used to efficiently and scalably deploy configuration changes to sets of devices managed by such a containerized environment.

Method 800 may perform operation 802 during which one or more changes in a network configuration are identified. In various embodiments, the one or more changes may be identified by a connection manager. Such changes may be changes made by an entity, such as a user or manufacturer, to network connection settings or other information, such as authentication information. For example, an authentication passwords may have been changed for network access. In some embodiments, the change is detected by a connection manager in an AP. In one example, the change may be received by the connection manager from another entity, such as a cloud manager or a controller. Accordingly, such changes may have been made by a manufacturer, and may be communicated to the connection manager via another system component, such as a cloud manager or a controller that may oversee multiple APs.

Method 800 may perform operation 804 during which the one or more configuration changes are applied to a device-specific container. Accordingly, the connection manager may identify a particular device-specific container for which the change is to be applied, and may send a message to the device-specific container that identifies the network configuration change. In some embodiments, the connection manager may also generate a temporary SSID for a temporary network, and may instruct the device-specific container and its associated devices to connect to the temporary network while the changes are implemented for the original network and SSID.

Method 800 may perform operation 806 during which the one or more configuration changes are enforced for devices associated with the device-specific container. Accordingly, the device-specific container may implement the changes and update its configuration information. For example, the device-specific container may update its authentication information with new credentials. In the example where a temporary network is used, the device-specific container may also switch back to the original network and SSID.

Method 800 may perform operation 808 during which a verification message is received at the connection manager. Accordingly, once the update is complete, the device-specific container may send a verification message to the connection manager to indicate that the update is complete and was perform successfully. It will be appreciated that any suitable message may be sent. For example, if the update was not successfully performed, an error message may be sent.

Figure 9:
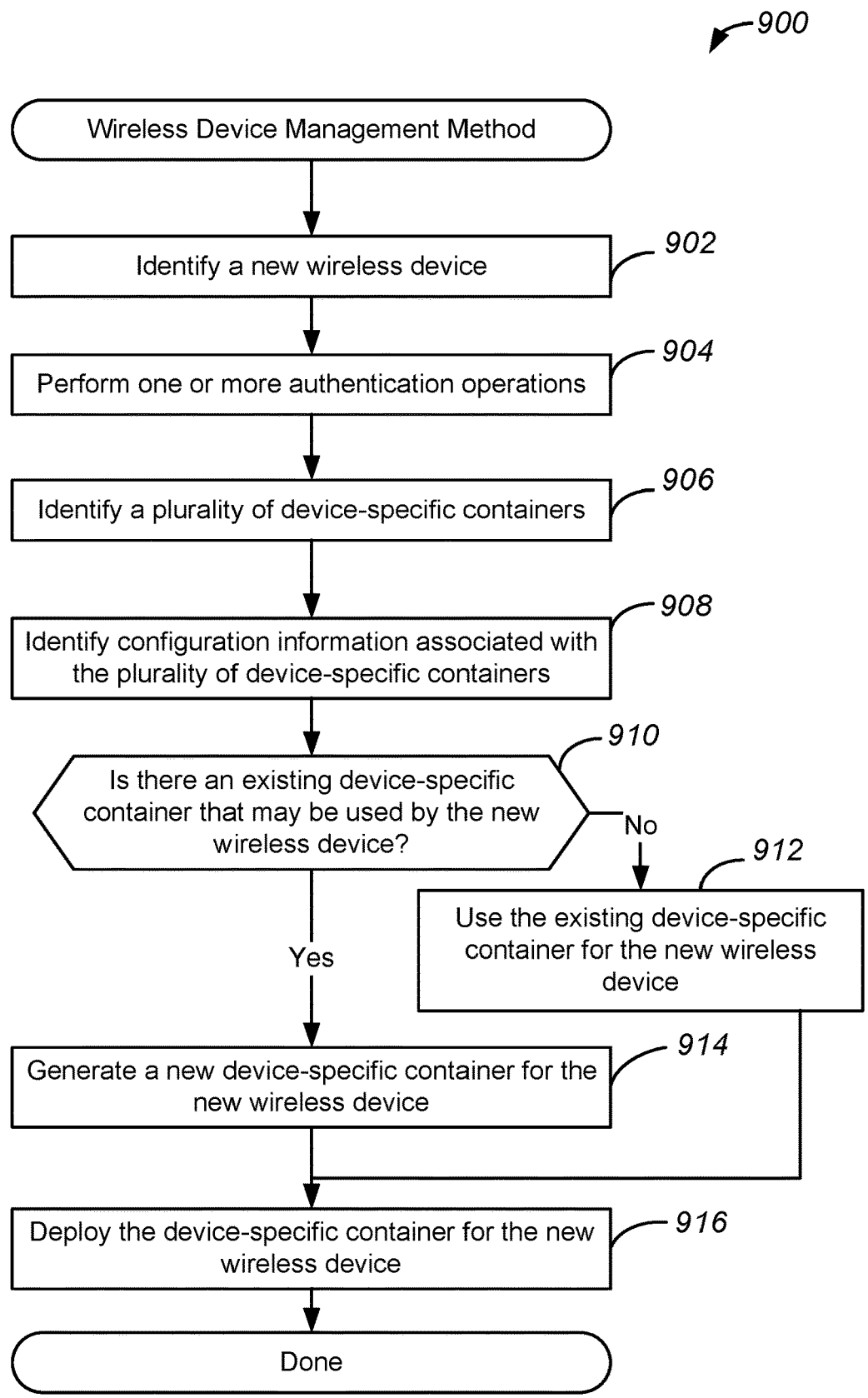
FIG. 9 illustrates another example of a method for secure management of wireless device associations, performed in accordance with some embodiments.

FIG. 9 illustrates another example of a method for secure management of wireless device associations, performed in accordance with some embodiments. As similarly discussed above, a method, such as method 900, may be performed to implement a containerized environment capable of performing wireless connection management operations, as well as updating devices included in sets of devices associated with a device-specific container. Accordingly, as will be discussed in greater detail below, methods disclosed herein may be performed to add and/or subtract devices from sets of devices, and to dynamically assign newly detected devices to one or more existing containers.

Method 900 may perform operation 902 during which a new wireless device may be identified. Accordingly, a new wireless device may be detected by an AP via one or more device discovery operations. Thus, the wireless device may connect to a network used by the AP, and may either respond to a broadcast message from the AP, or may proactively advertise its presence to the AP.

Method 900 may perform operation 904 during which one or more authentication operations may be performed for the new wireless device. More specifically, during operation 904, credential information may be determined for the new wireless device, and may be authenticated. Such credential information may include an existing password, or a temporary password.

Method 900 may perform operation 906 during which a plurality of device-specific containers may be identified. Accordingly, the AP may query a component, such as a connection manager and/or one or more device-specific containers, and may identify a currently instantiated containers managed by the AP. Moreover, device information associated with each of the device-specific containers may also be identified and retrieved.

Method 900 may perform operation 908 during which configuration information associated with the plurality of device-specific containers may be identified. In various embodiments, the configuration information may be determined based on the retrieved device information and may identify network configuration and capability information for each of the device-specific containers. Such network configuration information may include an identification of wireless security protocols, a wireless security protocol identifier, a MAC address, an IP address, as well as various other identifiers and metrics, such as a signal quality metric. In this way, the AP may have a current accounting of device-specific containers that are instantiated, as well as a network configuration of each of the device-specific containers.

Method 900 may perform operation 910 during which it may be determined if an existing device-specific container may be used for the new wireless device. Such a determination may be made based on a comparison of device information associated with the new wireless device and device information for each of the device-specific containers. Accordingly, a device-specific container may be identified as an acceptable candidate if the device information matches. If more than one device-specific container matches, one or more device-specific container parameters may be used to select one. For example, a device-specific container with a fewest number of devices may be selected.

Accordingly, if it is determined that an existing device-specific container may be used for the new wireless device, method 900 may perform operation 912 during which the identified existing device-specific container is used. More specifically, the set of devices associated with that device-specific container may be updated to include the new wireless device, and the new wireless device may be associated with the BSSID for that device-specific container.

Returning to operation 910, if it is determined that no existing device-specific container exists, method 900 may perform operation 914 during which a new device-specific container may be generated based on the device and network configuration information of the new wireless device.

Method 900 may perform operation 916 during which the device-specific container for the new wireless device may be deployed. Accordingly, the new or updated device-specific container may be deployed such that the new network configuration is enforced for all devices associated with the new or updated device-specific container. In this way, the new wireless device may be associated with a device-specific container and its associated BSSID.

Figure 10:
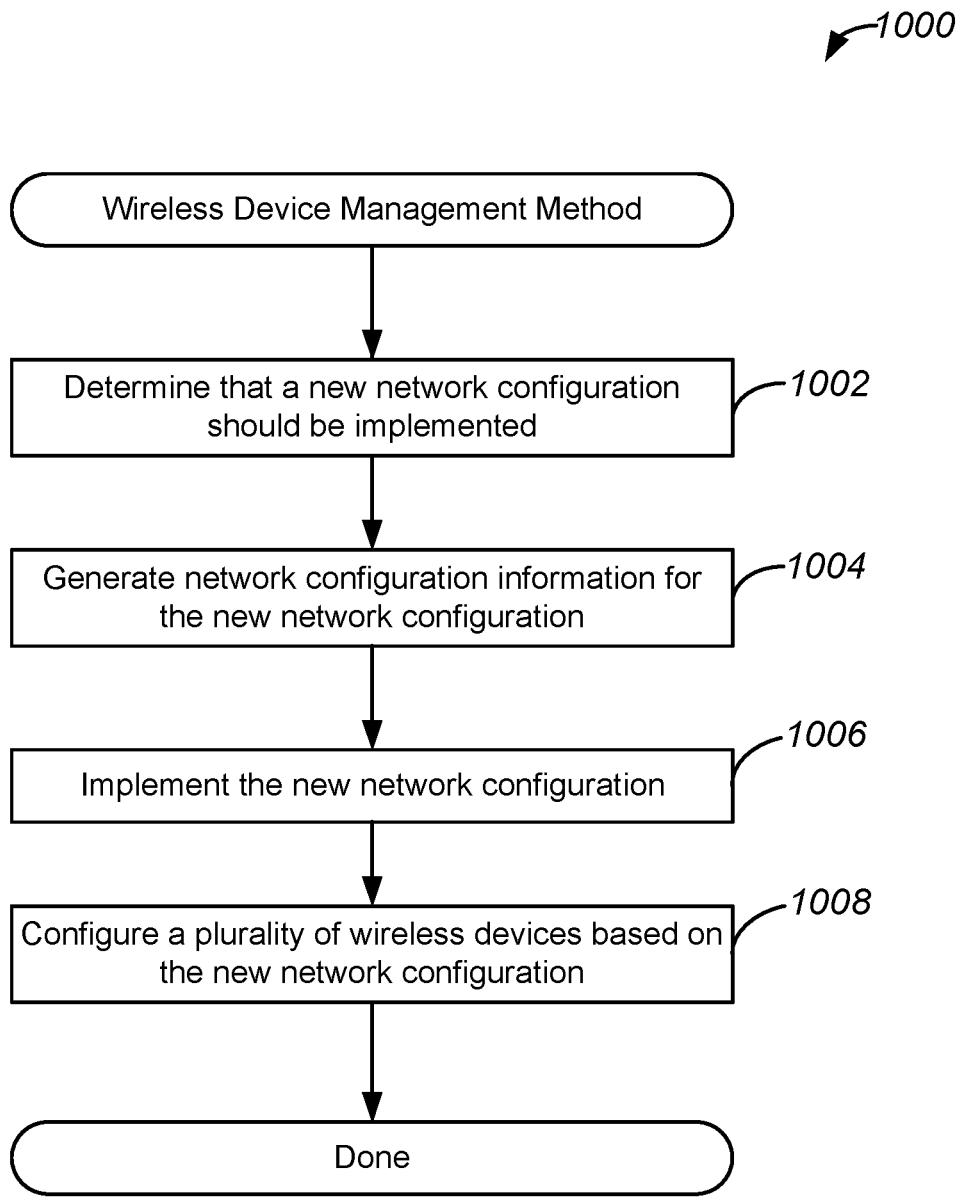
FIG. 10 illustrates yet another example of a method for secure management of wireless device associations, performed in accordance with some embodiments.

FIG. 10 illustrates another example of a method for secure management of wireless device associations, performed in accordance with some embodiments. As similarly discussed above, a method, such as method 1000, may be performed to implement a containerized environment capable of performing wireless connection management operations. As will be discussed in greater detail below, methods disclosed herein may be performed to change network configuration information for one or more existing network connections and their associated device-specific containers.

Method 1000 may perform operation 1002 during which it may be determined that a new network configuration should be implemented. In various embodiments, the new network configuration may be requested in response to identifying a new device, or determining a new network and new BSSID should be used. In an example with a single AP, a connection manager included in the AP may determine that the new network configuration should be implemented. In an example with multiple APs, a connection manager included in an AP may send a request to a controller, or a connection manager included in the controller may make the determination.

Method 1000 may perform operation 1004 during which the new network configuration information may be generated. Accordingly, network configuration information may be generated based on the determination made during operation 1002. The new network configuration information may include, among other things, a new BSSID. Accordingly, during operation 1004, a new BSSID may be generated that will be used by the AP.

Method 1000 may perform operation 1006 during which the new network configuration is implemented. Accordingly, a connection manager may execute the new network configuration via a hosting daemon, as discussed above, and may also communicate the new network configuration to the appropriate device-specific containers, as will be discussed in greater detail below.

Method 1000 may perform operation 1008 during which a plurality of devices are configured based on the new network configuration. As similarly discussed above, the device-specific containers may communicate to their associated devices and update the configuration information of the devices with the new network configuration information. In this way, the device-specific containers may manage the updates and configuration of their associated wireless devices.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
   identifying a plurality of wireless devices communicatively coupled to an access point;
   generating, using one or more processing elements, a plurality of groups of wireless devices based, at least in part, on a plurality of device classification parameters associated with the plurality of wireless devices, wherein the plurality of device classification parameters comprises one or more identifiers identifying a manufacturer of a device;
   generating, using the one or more processing elements, a plurality of containers for the plurality of groups of wireless devices based on network configuration information, wherein a container is generated for each group of the plurality of groups based on network configuration information and device information configured to be used by the access point to manage wireless connections for that group of wireless devices, and wherein each of the plurality of groups of wireless devices is associated with a container and a basic service set identifier (BSSID); and
   implementing, using the one or more processing elements, the plurality of containers in the access point, wherein each of the plurality of groups of wireless devices has at least one associated container, and wherein each container is configured to be used by a connection manager of the access point to implement connection settings for wireless connections between the access point and the group of wireless devices associated with each container.

2. The method of claim 1, wherein each container of the plurality of containers is a device-specific virtual machine associated with a set of the plurality of wireless devices.

3. The method of claim 1 further comprising:
   configuring the plurality of wireless devices based on the network configuration information.

4. The method of claim 1 further comprising:
   identifying, using the access point, a new wireless device; and
   associating the new wireless device with an existing container and BSSID.

5. The method of claim 1 further comprising:
   identifying, using the access point, a new network configuration;
   configuring one or more of the plurality of containers based on the new network configuration; and
   configuring the plurality of wireless devices based on the new network configuration information.

6. The method of claim 5, wherein the new network configuration comprises a new BSSID.

7. The method of claim 1, wherein the network configuration information comprises one or more of a wireless security protocol identifier, a media access control (MAC) address, an internet protocol (IP) address, and a signal quality metric.

8. A system comprising:
   a plurality of network interface cards (NICs) configured to communicate with a plurality of wireless devices;
   a processing device comprising one or more processing elements included in a processor configured to:
      generate a plurality of groups of wireless devices based, at least in part, on a plurality of device classification parameters associated with the plurality of wireless devices, wherein the plurality of device classification parameters comprises one or more identifiers identifying a manufacturer of a device;
      generate a plurality of containers for the plurality of groups of wireless devices based on network configuration information, wherein a container is generated for each group of the plurality of groups based on network configuration information and device information configured to be used by an access point to manage wireless connections for that group of wireless devices, and wherein each of the plurality of groups of wireless devices is associated with a container and a basic service set identifier (BSSID); and
      implement the plurality of containers in an access point, wherein each of the plurality of groups of wireless devices has at least one associated container, and wherein each container is configured to be used by a connection manager of the access point to implement connection settings for wireless connections between the access point and the group of wireless devices associated with each container.

9. The system of claim 8, wherein each container of the plurality of containers is a device-specific virtual machine associated with a set of the plurality of wireless devices.

10. The system of claim 8, wherein the processing device is further configured to:
 identify a new wireless device; and
 associate the new wireless device with an existing container and BSSID.

11. The system of claim 8, wherein the processing device is further configured to:
 identify a new network configuration;
 configure one or more of the plurality of containers based on the new network configuration; and
 configure the plurality of wireless devices based on the new network configuration.

12. The system of claim 11, wherein the new network configuration comprises a new BSSID.

13. A device comprising:
 a transceiver configured to communicate with a plurality of wireless devices; and
 one or more processing elements included in a processor configured to:
  generate a plurality of groups of wireless devices based, at least in part, on a plurality of device classification parameters associated with the plurality of wireless devices, wherein the plurality of device classification parameters comprises one or more identifiers identifying a manufacturer of a device;
  generate a plurality of containers for the plurality of groups of wireless devices based on network configuration information, wherein a container is generated for each group of the plurality of groups based on network configuration information and device information configured to be used by an access point to manage wireless connections for that group of wireless devices, and wherein each of the plurality of groups of wireless devices is associated with a container and a basic service set identifier (BSSID); and
  implement the plurality of containers in an access point, wherein each of the plurality of groups of wireless devices has at least one associated container, and wherein each container is configured to be used by a connection manager of the access point to implement connection settings for wireless connections between the access point and the group of wireless devices associated with each container.

14. The device of claim 13, wherein each container of the plurality of containers is a device-specific virtual machine associated with a set of the plurality of wireless devices.

15. The device of claim 13, wherein the one or more processing elements are further configured to:
 identify a new wireless device; and
 associate the new wireless device with an existing container and BSSID.

16. The device of claim 13, wherein the one or more processing elements are further configured to:
 identify a new network configuration;
 configure one or more of the plurality of containers based on the new network configuration; and
 configure the plurality of wireless devices based on the new network configuration information.

* * * * *